US011626782B2

(12) United States Patent
Rasp et al.

(10) Patent No.: US 11,626,782 B2
(45) Date of Patent: Apr. 11, 2023

(54) METHOD AND DEVICE FOR INDUCTIVELY HEATING A STATOR OR ARMATURE OF AN ELECTRIC MACHINE

(71) Applicant: GEHRING TECHNOLOGIES GMBH + CO. KG, Ostfildern (DE)

(72) Inventors: Richard A. Rasp, Usingen (DE); Marco Vocke, Wernigerode (DE)

(73) Assignee: GEHRING TECHNOLOGIES GMBH + CO. KG, Ostfildern (DE)

( * ) Notice: Subject to any disclaimer, the term of this patent is extended or adjusted under 35 U.S.C. 154(b) by 566 days.

(21) Appl. No.: 16/621,040

(22) PCT Filed: Jun. 5, 2018

(86) PCT No.: PCT/DE2018/000171
§ 371 (c)(1),
(2) Date: Dec. 10, 2019

(87) PCT Pub. No.: WO2018/224066
PCT Pub. Date: Dec. 13, 2018

(65) Prior Publication Data
US 2020/0204050 A1 Jun. 25, 2020

(30) Foreign Application Priority Data
Jun. 10, 2017 (DE) .................... 10 2017 005 532.7

(51) Int. Cl.
*H05B 6/40* (2006.01)
*H05B 6/44* (2006.01)
(Continued)

(52) U.S. Cl.
CPC .......... *H02K 15/12* (2013.01); *H05B 1/0247* (2013.01); *H05B 6/04* (2013.01); *H05B 6/08* (2013.01);
(Continued)

(58) Field of Classification Search
CPC . D06C 3/02; D06C 3/023; D06C 3/10; H02K 15/12; H02K 2213/03;
(Continued)

(56) References Cited

U.S. PATENT DOCUMENTS

| 2,451,954 | A | * | 10/1948 | Johns | ..................... | H02K 19/24 |
| | | | | | | 322/63 |
| 3,456,615 | A | | 7/1969 | Zander et al. | | |
| 2007/0068911 | A1 | | 3/2007 | Gerth | | |

FOREIGN PATENT DOCUMENTS

| CN | 101548453 A | 9/2009 |
| CN | 102741461 A | 10/2012 |

(Continued)

OTHER PUBLICATIONS

Translation of JP2015046246A, "Stator Work Heating Device, Stator Work Heating Method, and Method of Manufacturing Stator Coil", Mar. 12, 2015, by ProQuest. (Year: 2015).*

(Continued)

*Primary Examiner* — Quang T Van
(74) *Attorney, Agent, or Firm* — Carter, DeLuca & Farrell LLP

(57) ABSTRACT

The invention relates to a method and a heating device (1c) for inductively heating a stator (2) or armature (3) of an electric machine, in particular before and during trickle impregnation thereof. In addition, the invention relates to an impregnating device (50) in which this heating device (1c) is integrated. According to the invention, it is provided that the heating takes place inductively by electromagnetic fields of different frequencies. For this purpose, it is provided in the case of the heating device (1c) that it has at least one electromagnetic inductor (18, 21, 24) which is disposed coaxially or axially parallel with respect to the longitudinal axis (7) of the stator (2) or armature (3) and which inductively heats said stator or armature, and that the at least one (Continued)

Figure 1:
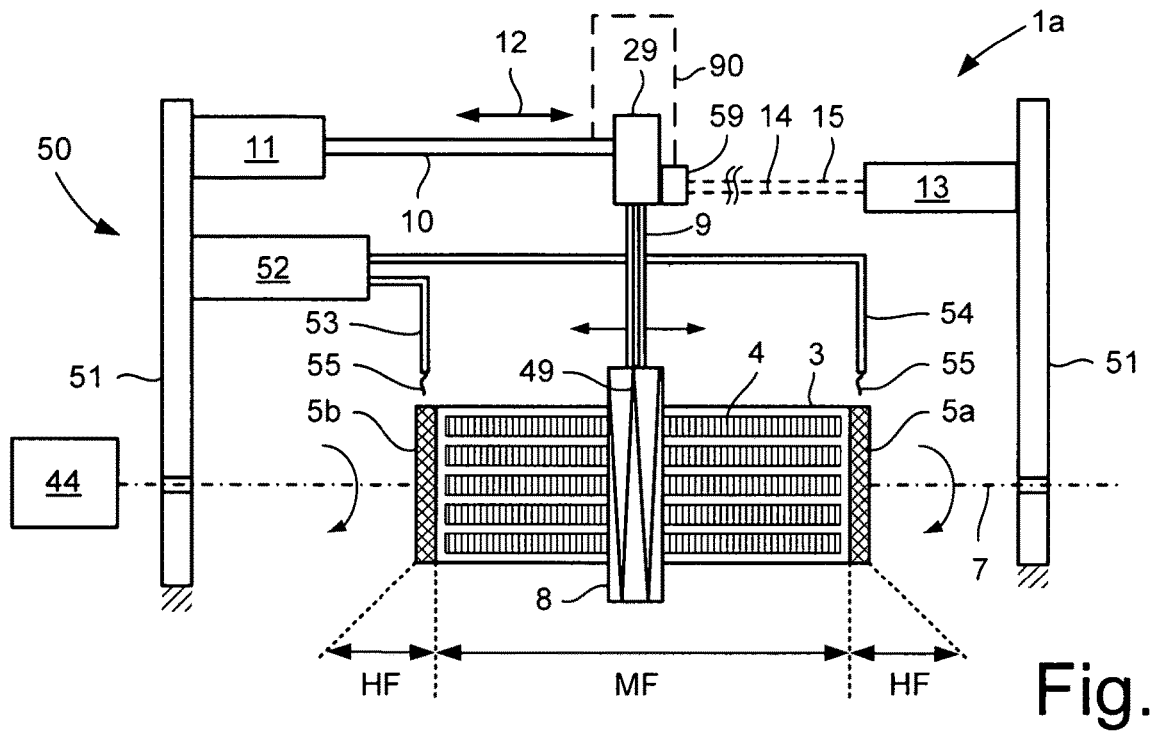

inductor (18, 21, 24) is designed to generate at least two electromagnetic fields of different frequencies.

37 Claims, 8 Drawing Sheets

(51) Int. Cl.
  *H02K 15/12* (2006.01)
  *H05B 1/02* (2006.01)
  *H05B 6/04* (2006.01)
  *H05B 6/08* (2006.01)
  *H05B 6/10* (2006.01)
  *H05B 6/36* (2006.01)
  *H05B 6/38* (2006.01)

(52) U.S. Cl.
  CPC ............... *H05B 6/102* (2013.01); *H05B 6/36* (2013.01); *H05B 6/365* (2013.01); *H05B 6/38* (2013.01); *H05B 6/40* (2013.01); *H05B 6/44* (2013.01); *H02K 2213/03* (2013.01); *H05B 2206/022* (2013.01)

(58) Field of Classification Search
  CPC .. H05B 1/0247; H05B 2206/022; H05B 6/04; H05B 6/08; H05B 6/101; H05B 6/102; H05B 6/36; H05B 6/365; H05B 6/38; H05B 6/40; H05B 6/44
  USPC ....... 219/600, 619, 635, 639, 640, 650, 653, 219/665, 670
  See application file for complete search history.

(56) References Cited

FOREIGN PATENT DOCUMENTS

| | | | |
|---|---|---|---|
| CN | 110999046 A | | 4/2020 |
| DE | 47392 A | | 4/1966 |
| DE | 1919642 A1 | | 11/1970 |
| DE | 69720869 T2 | | 3/2004 |
| DE | 102005028047 A1 | | 1/2006 |
| EP | 2104207 A1 | | 9/2009 |
| GB | 200469 A | | 10/1923 |
| JP | H0917559 A | | 1/1997 |
| JP | H09133198 A | | 5/1997 |
| JP | 2003342637 A | * | 12/2003 |
| JP | 2015046246 A | | 3/2015 |
| KR | 101659238 B1 | | 9/2016 |
| WO | 2011048473 A1 | | 4/2011 |
| WO | 2017021373 | | 2/2017 |

OTHER PUBLICATIONS

Notice to Submit Response, Korean Application No. 10-2020-7000841 dated Dec. 13, 2021 with English Translation.

Chinese Office Action for application No. 201880051973.4 dated Jun. 25, 2021 with English translation.

German Examination Report (with English translation) issued in corresponding German Application No. 10 2017 005 532.7 dated Dec. 12, 2018, 11 pages.

* cited by examiner

METHOD AND DEVICE FOR INDUCTIVELY HEATING A STATOR OR ARMATURE OF AN ELECTRIC MACHINE

The invention relates to a method and a device for inductively heating a stator or armature of an electric machine, in particular before and during a trickle impregnation thereof. The invention further relates to an impregnating device designed for this purpose.

In the context of the invention, the term "electric machine" or "electrical machine" means only electric motors and electric generators which convert electrical energy into mechanical energy or mechanical energy into electrical energy. The winding of such an electric machine can be designed as a coil winding or as a so-called bar winding. Although electrical machines with bar windings are currently regarded as trend-setting in the automotive industry, the invention should be usable both with regard to a method and with regard to a device for electric machines of all winding types. Therefore, when the terms "winding head" and "winding" are used below, no definition is made with regard to coil winding or bar winding.

In DD 47 392 B1 it has already been proposed to use bar windings for the production of the winding of high-performance electrical machines. These bar windings consist of a large number of solid bars of a highly electrically-conductive material. After they are inserted into the grooves of armature or stator laminations, the bars are connected to each other in such a way that they form at least one winding strand depending on the design. According to an embodiment known from GB 200,469 B, the bars used for the construction of a bar winding can have a substantially U-shaped geometry in which two parallel legs are integrally connected to one another by means of a connecting leg. The cross-sectional geometry of the legs is rectangular. Such bars are also known as so-called hairpins. So that the two mutually parallel legs of the U-shaped bars can be placed in an armature or stator lamination in radially offset grooves, the known U-shaped bars from GB 200,469 B have an offset area in the region of the connecting legs thereof in which the U-shaped bar is twisted into itself.

Moreover, it is known that in the manufacture of an electric machine, be it an electric motor or a generator, the windings of the stator and armature must be made solid. In addition to so-called dip-rolling, this is done today by means of a trickle method and a related impregnating device. The stator or the armature is heated for this purpose and clamped in the impregnating device with respect to its longitudinal axis and rotated about this longitudinal axis. The stator or armature can be inclined or horizontally aligned. Subsequently, preferably at the higher axial end of the stator or armature, for example at the winding head, a synthetic resin which is initially liquid at room temperature is applied through trickling. The synthetic resin may consist of one or more components, for example a base synthetic resin and a hardener.

The volume flow rate at which the still liquid synthetic resin is applied to the stator or armature is matched to the respective absorption capacity of the same. After the trickling, the synthetic resin penetrates into the spaces between the winding wires and into the interstices between the winding wires and the laminations of the lamination core and fills these gaps completely. The individual laminations of the lamination core are permanently connected to each other by way of a baked-on enamel or by welding. Upon subsequent heating of the stator or armature, the synthetic resin initially gels and thereby loses its tendency to drip so that the stator or armature is then usually placed horizontally to prevent sagging of the synthetic resin to the otherwise lower part of the stator or armature. As a result, a homogeneous distribution of the amount of synthetic resin introduced into the stator or armature is ultimately ensured. In a further heating to a curing temperature of the synthetic resin, this solidifies and becomes a thermoset, which renewed heating can no longer deform after this curing step. As a result, the components of the stator or armature which come into contact with the synthetic resin are firmly connected. The thermoset meets all mechanical and electrical insulation requirements that are placed on a stationary or rotating electrical machine.

In order to ensure optimum penetration of the initially liquid synthetic resin into the stator or armature, at least the stator or armature is heated to a so-called trickling temperature prior to the start of the trickling operation and kept at this temperature during the trickling operation. The trickling temperature may be between 90° C. and 120° C., depending on the synthetic resin used, for example. After a predetermined amount of the initially still liquid synthetic resin is introduced into the stator or armature, it is heated to a curing temperature—also synthetic resin-dependent—for example between 150° C. and 170° C. This curing temperature is then maintained for a predetermined period of time to allow for complete curing after initial gelling of the synthetic resin. Finally, the stator or armature is cooled to room temperature and prepared for further manufacturing operations to produce the electric machine.

The heating of the stator or armature to the trickle temperature and the curing temperature can be carried out in a suitable oven. From DE 1 212 204 A and DE 19 19 642 A, heating of the stator or armature by means of an electrical heating current passed through the windings of the stator or armature is prior art. Since simply passing a heating current through the windings can lead to large deviations of the achievable actual temperatures from the desired target temperatures, it has been proposed to ensure the achievement and maintenance of the desired temperatures by controlling the heating current. In this case, the knowledge that in a winding the ohmic resistance increases with increasing temperature was used, so that the temperature of the winding can be deduced from the ohmic resistance. It has therefore been proposed in DE 1 212 204 A that the heating current conducted through the winding of the stator or armature is switched off when the electrical resistance value of the winding required to achieve the trickle temperature or curing temperature has been reached. The heating current is only switched on again when a predetermined lower resistance value of the winding is measured, which is equivalent to falling below a lower limit temperature.

However, the disadvantage of these known methods and the apparatuses used for impregnating a stator or armature of an electric machine is that the temperature control is carried out by means of a heating current passed through the winding, and it is technically complicated to feed this current to the rotating stator or armature. In addition, the methods and devices proposed in the two publications have the defect that the heating current controls are turned off solely based on the temperature of the winding through which the heating current flows. This is unfavorable at least in those periods in which the other components surrounding the windings have not yet assumed the temperature of the windings. However, since the synthetic resin comes into contact not only between adjacent wires or wire sections of the windings but also with other components of the stator or armature, the temperature there is not precisely known for the synthetic resin. Therefore, at least the heating-up phase must be extended based on experience until the trickling temperature has been reached and it can be assumed that the winding temperature determined by the electrical resistance measurement is also present in all other components of the stator or armature. Only then can the trickling of the synthetic resin begin in the stator or armature with the desired process reliability. Since this uncertainty regarding the temperatures of the components of the stator or armature and the synthetic resin is also present at the beginning of the curing process, this process must also be extended disadvantageously for a safety period. Lastly, it is disadvantageous that the heating of the synthetic resin takes place only indirectly through heat transfer between the winding wires and the resin. This also means that reaching the trickle temperature and the curing temperature takes a comparatively long time.

The described time periods for the impregnation of a stator or armature result in a costly prolongation of the production time and an increase in energy costs for heating up to and maintaining the trickling and curing temperatures.

The object of the invention is therefore to provide a method and apparatus for faster heating and better maintaining of a stator or armature temperature with which ultimately the impregnation of a stator or armature of an electric machine with a thermosetting synthetic resin can be done faster, more energy-efficiently and cost-effectively than before. In addition, an impregnating device is to be proposed in which said apparatus is integrated.

The solution to this problem is achieved with an inductively-operating heating device which has the features of claim 1. A method for operating such a device is defined in the independent method claim. In addition, another impregnation device is claimed in a further independent device claim, a heating device designed according to the invention being integrated therewith. Advantageous developments are defined in the respective associated dependent claims.

The invention was based on the finding that a stator or armature of an electric machine consists of different components, which have different electrical conductivities and therefore heat up through induction differently.

These include, in particular, the lamination core which is made of an iron material, the windings, which consist of copper, for example, the insulator disposed between the winding wires and the lamination core, as well as the synthetic resin to be introduced into the stator or armature by means of the trickle method. In addition, the winding wires near the axial end-side winding heads of the armature or stator are disposed radially on the outside and are partially exposed, whereas the winding wires are disposed near the lamination cores therebetween and largely radially inward.

From this it was apparent that during inductive heating of a stator or armature, some of its components are heated faster than others, so that in addition to the inductive heating, heat conduction and heat radiation between adjacent and differently-heated components or materials of the stator or armature must be used in order to bring all the components as a whole to a desired temperature and to maintain it.

Unfortunately, the heat transfer between two immediately-adjacent materials takes place comparatively slowly, as a result of which the trickling process known per se for introducing and curing a synthetic resin into the stator or armature appeared in need of improvement, in particular with regard to the aforementioned multiple temperature increase.

The invention was also based on the finding that the penetration depth of an electromagnetic field into a component is also dependent on the frequency of the field. Such an electromagnetic field must undergo an alternating change in its orientation in order to produce an inductive effect in a stationary stator or armature. In principle, the penetration depth of such a field increases with decreasing frequency. Consequently, a low-frequency or medium-frequency electromagnetic field can penetrate deeper into a component and generate an inductive heating there than can be penetrated with a high-frequency electromagnetic field. A low-frequency electromagnetic field is defined as one that oscillates at a frequency of less than 8 kHz. According to this definition, a medium-frequency electromagnetic field oscillates at 8 to 60 kHz and a high frequency electromagnetic field oscillates at 61 to 500 kHz.

Finally, the invention was based on the finding that the winding heads of a stator or armature produced from copper wire can be heated inductively very well with a high-frequency field, while the iron-containing laminations of the lamination core of a stator or armature can be heated particularly well inductively with a medium-frequency field.

The described findings led to the invention briefly described below. Subsequently, various embodiments will be described.

Accordingly, the invention initially relates to a method for inductively heating a stator or armature of an electric machine and maintaining the heat, in particular before and during a trickle impregnation thereof, wherein the inductive heating takes place by means of electromagnetic fields of different frequency.

By the use of electromagnetic fields of different frequency, it is possible to penetrate the stator or armature radially to different depths and to heat the components thereof inductively at those depths. In addition, the fields, which oscillate at different frequencies, inductively heat the components of the stator or armature, which are made of different materials, at different intensities so that an overall faster temperature increase, a more uniform temperature distribution despite the different materials and an easier temperature maintenance of the stator or armature can be achieved in a targeted fashion.

For this purpose, it can be provided that the electromagnetic fields of different frequency act on the stator or armature simultaneously or one after the other. It is also possible, alternatively or additionally, to provide that the fields of different oscillating frequency act on different axial regions of the stator or armature.

It is also judged to be advantageous if the electromagnetic fields used oscillate in a mid-frequency range between 8 kHz and 60 kHz and in the high-frequency range between 61 kHz and 500 kHz (including the range limits), the frequency of the respective field being matched to the penetration depth at which said field is radially and inductively effective for heating in the stator or armature. For stators or armatures with a relatively large diameter, for example more than 0.5 meters, electromagnetic fields with a frequency of less than 8 kHz can also be used advantageously.

It is preferably provided for at least a first electromagnetic field to act on the stator or armature, the field mainly leading to the inductive heating of the ferrous components of the stator or armature, and for at least a second electromagnetic field to act on the stator or armature at a frequency which is tuned to primarily inductively heat the copper-containing components of said stator or armature.

More specifically, it will be provided that a medium-frequency electromagnetic field acts on an axially central portion of the stator or armature in which a lamination core of said stator or armature is disposed as a ferrous component, and that at the two axial ends of the stator or armature, where winding heads thereof are disposed as copper-containing components, a high-frequency alternating field acts on the stator or armature, respectively.

In order to be able to achieve a uniform heating and constant maintenance of the elevated temperature of axially long stators or armatures in particular, it can be provided that the electromagnetic fields of different frequency are moved back and forth coaxially or in parallel with the longitudinal axis of the stator or armature. This is done by a preferably coaxial translation of an inductor over the length of the region of the stator or armature to be heated. In a non-coaxial arrangement of the electromagnetic fields in relation to the longitudinal axis of the stator or armature, the stator or armature must be rotated about just this longitudinal axis in order to achieve even heating.

Such an inductor consists essentially of an annular or helical bobbin, the coil ends of which transition into two radial bars. These two radial bars are connected to a coupling piece which supports and electrically insulates the radial bars from one another. The coupling piece is connected directly to the final control element of an axial actuator or by way of a coaxial transformer, the axial actuator moving the inductor linearly back and forth relative to the longitudinal axis of the stator or armature. The radial bars and the circular or helical bobbin preferably consist of a highly electrically-conductive tube, for example a copper tube, through which a cooling liquid can be passed.

The translational movement of the inductor can be uniform or accelerated between the points of reversal of motion. It is also possible to use a movement pattern previously determined to be optimal, which specifies sections of lower or higher speed for the inductor along a translation path.

In certain applications, it is possible to deviate from a coaxial translation of the inductor with respect to the longitudinal axis of the stator or armature, so that as a result an eccentric translational movement is performed relative to said longitudinal axis. As a result, in certain designs of stator, armature and/or inductor, the inductive heating can be further optimized. However, this requires that the inner diameter of the inductor is so large that its annular induction coil cannot be moved back and forth coaxially but axially parallel above the stator or armature. In an arrangement of the inductor radially within a stator, the outer diameter of the inductor must accordingly be so small that coaxial motion is also not permitted, but rather axially parallel motion within the stator and relative to the longitudinal axis thereof.

For the same reason, as well as for the optimal distribution of the synthetic resin to be introduced into the stator or armature during the trickling process, it can be provided that the stator or armature is rotated about the longitudinal axis thereof during the acting of the electromagnetic fields of different frequency thereon.

With regard to the generation of fields of different frequency, according to a first advantageous embodiment these electromagnetic fields of different frequency can be applied for inductively heating the stator or armature from a single frequency generator, generated in temporal succession. As far as this is technically possible, a plurality of electromagnetic fields of different frequency can be generated simultaneously with the single frequency generator and by means of the single inductor, the electromagnetic fields then acting on the stator or armature.

In contrast to the plurality of frequency generators with only one inductor, a second embodiment provides electromagnetic fields, each being generated at a different frequency, and that these different-frequency fields act on the stator or armature, inductively heating the same.

In order to reduce a negative mutual influence of the adjacent, different-frequency fields and to improve the effectiveness of the inductive heating of the stator or armature, it can be provided that the different-frequency electromagnetic fields are concentrated at least in terms of axial extent.

In this case, it can be advantageously provided that the medium-frequency electromagnetic field is concentrated onto the region of the stator or armature in which the ferrous lamination core thereof is disposed, and that two high-frequency electromagnetic fields are concentrated onto the two axial ends of the stator or armature where the copper-containing winding heads thereof are disposed.

In this case, the medium-frequency electromagnetic field is preferably concentrated radially inward, and the two high-frequency electromagnetic fields are concentrated radially inward and axially outward.

A certain shielding on the one hand and a certain amplification in the effect of axially adjacent electromagnetic fields of different frequency can also be generated by means of destructive or constructive interference in the interference region thereof.

In order to exclude a mutual influence of the adjacent, different-frequency electromagnetic fields to a very large extent, it can be additionally provided that the medium-frequency electromagnetic field is shielded against the two high-frequency electromagnetic fields, for example by means of separate shielding elements therebetween. These shielding elements are preferably actively cooled with a cooling fluid.

Furthermore, it can be provided according to the method that, in the case of a stator, electromagnetic fields of the same or different frequency act thereon radially inwardly and/or radially outwardly in order to inductively heat the stator components. The electromagnetic field acting radially from the outside would be generated by a first inductor surrounding the stator coaxially or axially and annularly, while at least a second electromagnetic field is generated by at least a second inductor. Through this second inductor, a holder which rotatably holds the stator about its longitudinal axis can be passed through axially.

The device-related object has been achieved by a heating device for inductively heating a stator or armature of an electric machine and maintaining the heat, in particular before and during a trickle impregnation thereof, comprising at least one electromagnetic inductor which is disposed coaxially or axially parallel with respect to the longitudinal axis of the stator or armature and by means of which the stator or armature can be inductively heated, wherein the at least one inductor or the plurality of inductors is designed to generate at least two electromagnetic fields of different frequencies.

Accordingly, at least two electromagnetic fields with different frequencies can be generated by means of this heating device, with the respective frequencies being adjustable so that thereby different materials as well as different radial depths of the stator or armature can be optimally reached regarding the inductive heating thereof. As a result, the complete heating of all components of the stator or armature is faster and more uniform than before, so that the process duration for trickle impregnation of the same can be greatly reduced. As a result, the manufacturing costs are also reduced.

According to a first advantageous development of this heating device, the single inductor can be disposed coaxially or axially parallel and radially within the stator or coaxially or axially parallel and radially outside the armature, this single inductor can can be disposed moveably back and forth over the entire axial length of the stator or armature, and an electromagnetic field can be generated with this single inductor in the region of each of the two axial ends of the stator or armature, the electromagnetic fields differing in terms of oscillation frequency from an electromagnetic field acting between these two ends.

In this way, it is taken into account that the stator or armature has two winding heads made of copper-containing winding wires at the axial end and a lamination core and winding wires in a region disposed axially therebetween. These regions of the stator or armature cannot be optimally inductively heated with only one electromagnetic field due to the materials in place there and due to the installation depth. The use of two or more electromagnetic fields of different frequency is better suited for this, because each can be optimally matched to those components of the stator or armature and the radial installation depth thereof.

Against this background, an advantageous development of the said heating device provides that by means of the single inductor a high-frequency electromagnetic field can be generated in the region of the axial ends of the stator or armature and a medium-frequency electromagnetic field can be generated in the middle region therebetween.

For this purpose, according to a first embodiment it can be provided that the single inductor can be supplied alternatingly or simultaneously with a medium-frequency or high-frequency electrical voltage from a single frequency generator.

Alternatively, according to a second embodiment, it may be provided that the single inductor can be supplied alternately or simultaneously by a medium-frequency generator with a medium-frequency electrical voltage or by a high-frequency generator with a high-frequency electrical voltage.

However, a preferred third embodiment of the heating device provides that the device comprises three inductors disposed axially moveably, the inductors surrounding axial sections of the stator or armature coaxially or axially parallel, that a middle inductor is disposed above a central axial section of the stator or armature, a ferrous lamination core of the stator or armature being disposed in said inductor, that two axial end-side inductors are disposed in the region of the two axial ends of the stator or armature, copper-containing winding heads of the stator or armature being disposed in said inductor, that a medium-frequency electromagnetic field can be generated with the middle inductor, and that a high-frequency electromagnetic field can be generated by each of the two axial end-side inductors. Preferably, the three inductors are each supplied by a separate frequency generator with electrical voltage.

Regardless of the number of inductors it is preferably provided that the respective inductor has an annular or helical bobbin and a two-part radial bar, that each of the respective radial bars is connected to a coupling piece, and that each of these coupling pieces is connected at least indirectly to an associated axial actuator by means of which the inductor can move back and forth together with the radial bars coaxially or parallel to the longitudinal axis of the stator or armature.

As has already been indicated, apart from a coaxial arrangement of the inductor and the stator or armature, an axially-parallel arrangement of the same can also be provided in certain cases. As a result, the effective distance between the inductor and the stator or armature can be further optimized. However, for this it is necessary that in an arrangement of the inductor radially outward over the stator or armature, the inner diameter of the annular bobbin is large enough to allow an eccentric, axially parallel arrangement of the same. In an arrangement of the inductor radially inside the stator, the outer diameter of the bobbin of the inductor must accordingly be so small that a coaxial arrangement of the same relative to one another is impossible, but an axially parallel arrangement thereof is not.

What is important in this context is the size and the geometry of the radial gap between the bobbin of the inductor and the stator or armature. Optimally, the diameter of the bobbin of the inductor is exactly adapted to the inner diameter or outer diameter of the stator or armature. However, this optimum is not always achievable from an economic point of view, because ideally an individual inductor would have to be provided which fits exactly for each type of stator or armature, or to the inner diameter and/or outer diameter thereof. In order to avoid this additional expense, the proposed arrangement of the stator or armature, which is to be provided somewhat offset from the coaxial position, may be provided in relation to the bobbin of the respective inductor. The rotation of the stator or armature during operation of the inductor compensates for the effects of a partial, somewhat excessive radial gap resulting from the eccentric arrangement of the stator or armature.

In accordance with an advantageous embodiment, a coaxial transformer is attached to the coupling piece of the inductors, to which a medium-frequency or high-frequency electrical voltage of the associated frequency generator is passed, transformed there and guided to the bobbin of the respective inductor. The electrical lines between the respective frequency generators and the associated inductors are preferably guided in hose lines through which coolant flows.

The spatially comparatively closely arranged inductors can experience an adverse transformer effect in operation due to mutual interference. In this case, the high-frequency electromagnetic fields couple into the medium-frequency electromagnetic field, so that the voltage induced there can lead to damage of electronic components (for example, transistors). In order to prevent this danger in the functional region of the medium-frequency inductor or at the associated medium-frequency generator, it is possible to provide a suppression means which can generate, for example, a suppression induction complementary to the disturbance induction, so that the two mutually compensate each other. Since the medium-frequency inductor is mainly affected by spurious induction from the two high frequency electromagnetic fields, it is sufficient if the interference suppression means is integrated in the electrical lines which lead from the coaxial transformer to the medium-frequency generator in the region of the medium-frequency inductor.

So as to minimize the mutual electromagnetic influence and to provide a favorable design arrangement of the axial actuators, said radial bars of the three inductors are aligned with one another offset by 120° with respect to the longitudinal axis of the stator or armature. If required, however, other angular positions can also be used. The radial bars can also be designed as angled components.

In order to reduce mutual interference and to increase the effectiveness of the inductors, according to another embodiment it can be provided that at least one field concentrator, which consists of at least one ferrous member, can be disposed radially on the outside of the at least one inductor. This field concentrator is preferably constructed and disposed such that the medium-frequency electromagnetic field is concentrated radially inward thereby. As a result, a particularly effective inductive heating of the sheets of the lamination core disposed there is achieved.

If the at least one inductor is designed to be disposed radially inside a stator, the latter preferably has at least one field concentrator made of an iron material on its radial inner circumferential surface, the concentrator concentrating the alternating field of the inductor radially and axially outward.

In the case of the inductors associated with the two axial ends of the stator or armature, the field concentrators there are constructed and disposed in such a way that the high-frequency electromagnetic field generated thereby is concentrated radially inward and axially outward. In this way, on the one hand, a good inductive effectiveness is achieved at the winding heads of the stator or armature, and moreover any undesired interaction of the high-frequency electromagnetic fields with the axially intervening medium-frequency electromagnetic field is minimized.

To shield the end edges of the lamination core from an extreme interaction with the two high-frequency electromagnetic fields, a field shielding component can be disposed in each case in the region of these end edges, the component protecting the edges against too strong of coupling of the high-frequency electromagnetic field, and thus protecting against too much heating. These field-shielding components are preferably made of copper. They also have open end cooling channels through which a cooling fluid can be passed.

According to another embodiment of the device for heating a stator or armature, it can be provided that the field concentrators and the field-shielding components are designed and disposed such that constructive and/or destructive interference of the electromagnetic fields can be generated by means of which the heating power at the axial sections of the stator or armature is optimized specifically for iron (lamination core) and/or for copper (winding).

Whereas the inductors for generating the medium-frequency electromagnetic field and the two high-frequency electromagnetic fields axially movable back and forth, with respect to the field-shielding components, the components are disposed axially fixed during operation of the heater and coaxially disposed over the end edges of the lamination core of the stator or the armature.

In addition, it can be provided that the final control element of an axial actuator is connected to the at least one radial bar of an inductor by way of a coaxial transformer.

Furthermore, it can be provided with regard to the described heating device that in the arrangement with a plurality of inductors in the device, an electro-technical interference suppression means is arranged or designed in the line region between the medium-frequency inductor and the associated medium-frequency generator, the suppression means protecting the electronic components of the medium-frequency generator.

In order to be able to simultaneously heat a hollow cylindrical stator inductively from radially inward and radially outward, two inductors which act axially on a stator are preferably designed as so-called double inductors. These double inductors each have two radial, mutually offset, annular or helical bobbins, to each of which a medium-frequency or high-frequency electrical voltage is applied. As a result, the inductors generate electromagnetic fields in interaction with the materials of the stator. The radially inner bobbin is designed in terms of its dimensions so that it can be disposed in the cylindrical cavity and move back and forth axially therein without making contact. The radially outer bobbin is designed with respect to its dimensions such that it can be moved radially back and forth over the stator without making contact.

In order to further increase the effectiveness of these double inductors, it can be provided that an outer field concentrator is disposed radially on the radial outside of the radially outer bobbin for concentrating an electromagnetic field radially inward and optionally also axially outward, and that an inner field concentrator is disposed on the radial inside of the radially inner bobbin for concentrating an electromagnetic field radially outward and optionally also axially outward.

Although the use of two axial-end double inductors and a middle inductor disposed axially therebetween is very advantageous, care must be taken in this embodiment variant that the stator should be rotatably held in the heating device. Since the fixing of the stator is preferably to be done radially inward here, according to an advantageous development a component of a holding and driving device can be passed through the radially inner bobbin of at least one double inductor, by means of said component the stator is held drivably about its longitudinal axis.

Alternatively, it can be provided that only at one axial end a double inductor and, in addition, a second inductor (as described above) for heating the stator is disposed radially above it. The second inductor sweeps back and forth over a region between the axial ends of the stator. In this case, the free end of the stator, that is to say where no end-side double inductor is disposed, is connected to an element of a holding and driving device.

In the case of the at least one double inductor, provision may be made for the two annular or helical bobbins to be disposed in the same axial section or axially offset from one another. An arrangement of the two bobbins in the same axial section is advantageous if both the radially inner and the radially outer bobbin heat the same region of the stator or maintain an attained temperature there. Such a region may for example be a coil head of a stator.

If, however, the radially inner bobbin of the double inductor is intended to heat another region of the stator, then it can be provided that at least one of the two axial-end double inductors is designed such that the radially inner bobbin thereof is disposed axially closer to a middle inductor disposed axially therebetween than the respective radially outer bobbin.

Finally, an impregnating device is claimed, which has a frame, a stator or armature of an electric machine received on the frame mounted rotatably about the longitudinal axis thereof, a feeding device for feeding a liquid synthetic resin which cures under elevated heat effects and a device for heating the stator or armature, and which has at least one electromagnetic inductor which is disposed coaxially or axially parallel to the stator or armature, wherein said at least one inductor or the plurality of inductors is or are designed for generating at least two electromagnetic fields of different frequency.

This impregnating device can also have further of the above-mentioned features, corresponding to at least one of the device claims relating to the heating device.

Figure 2:
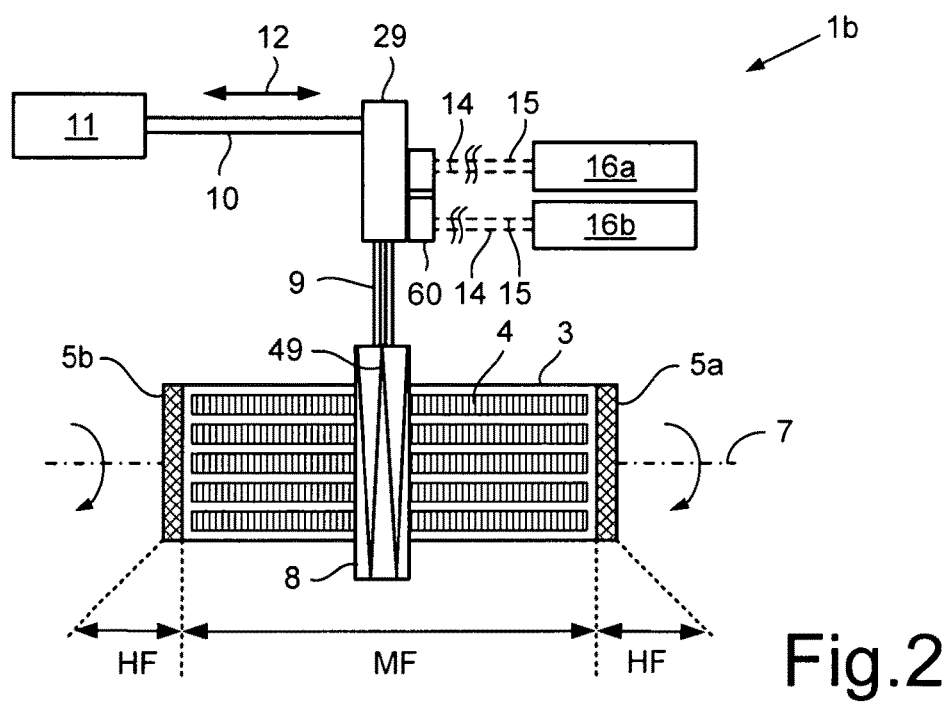
Figure 3:
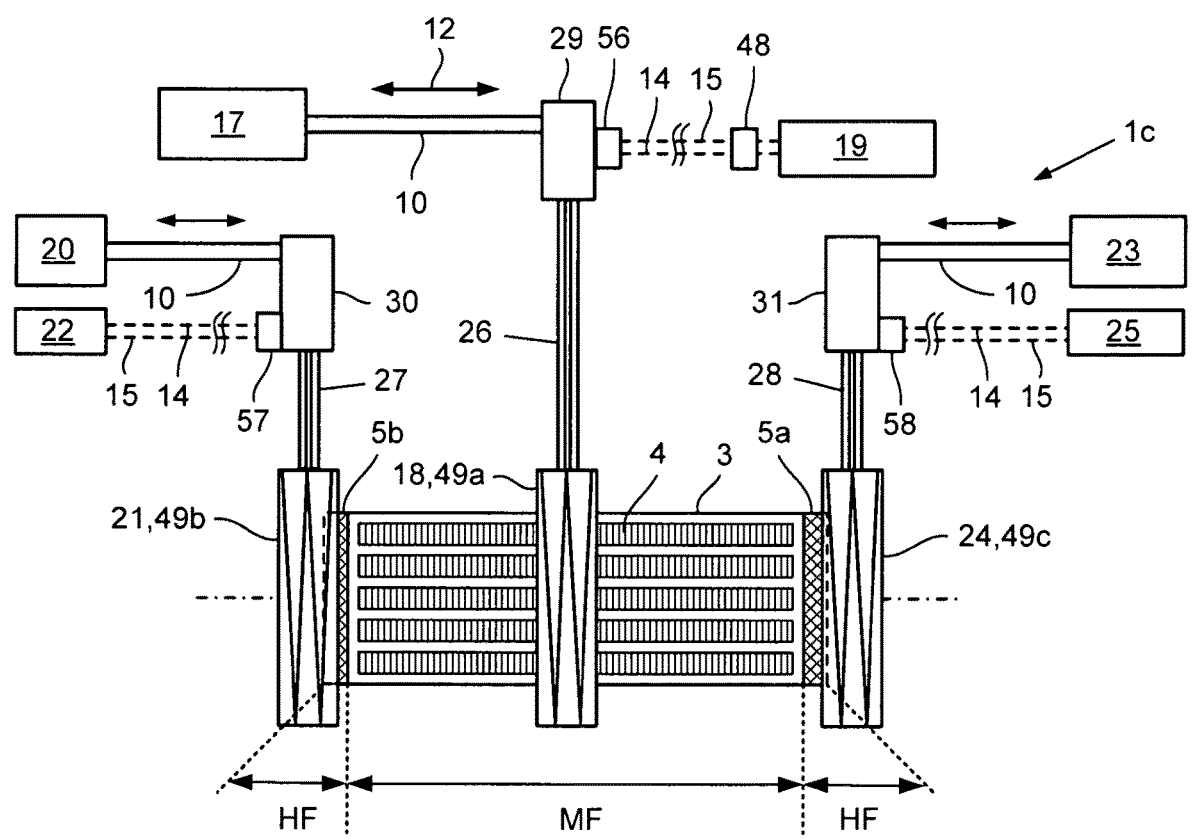
Figure 4:
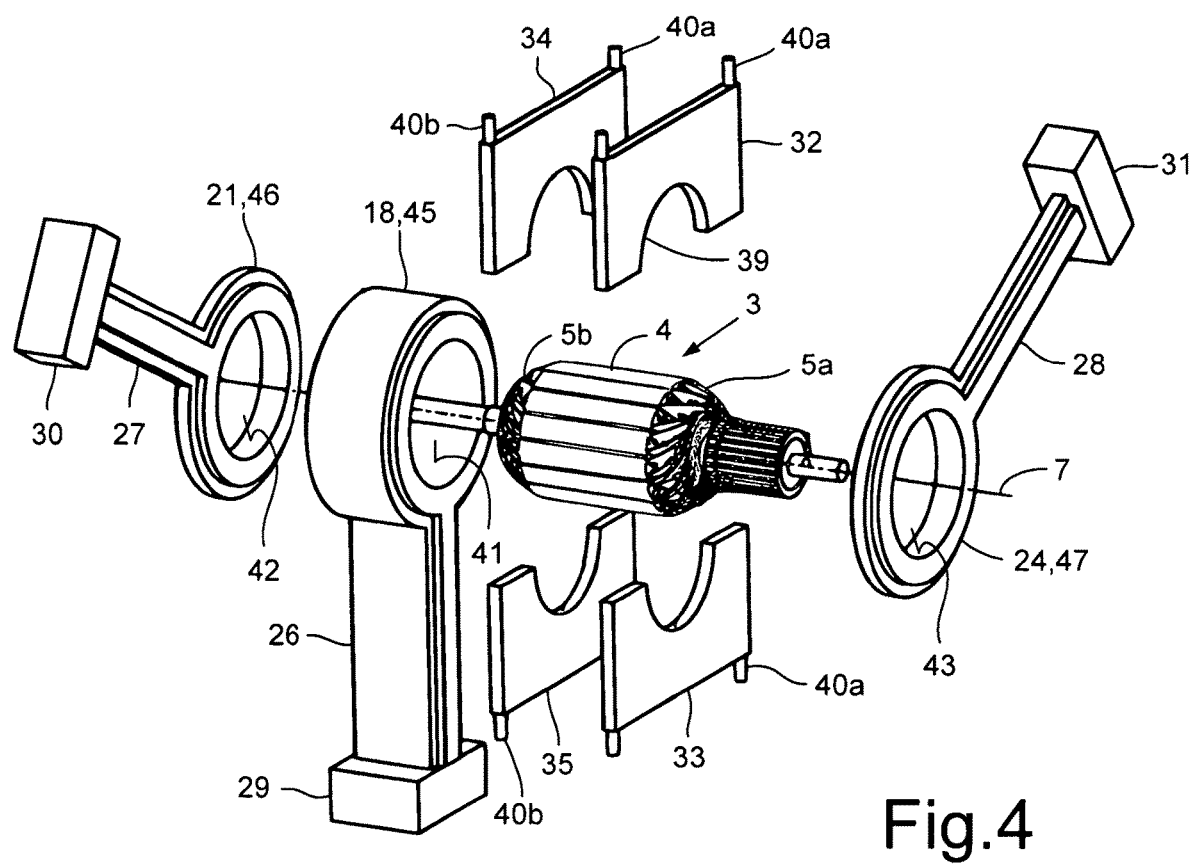
Figure 5:
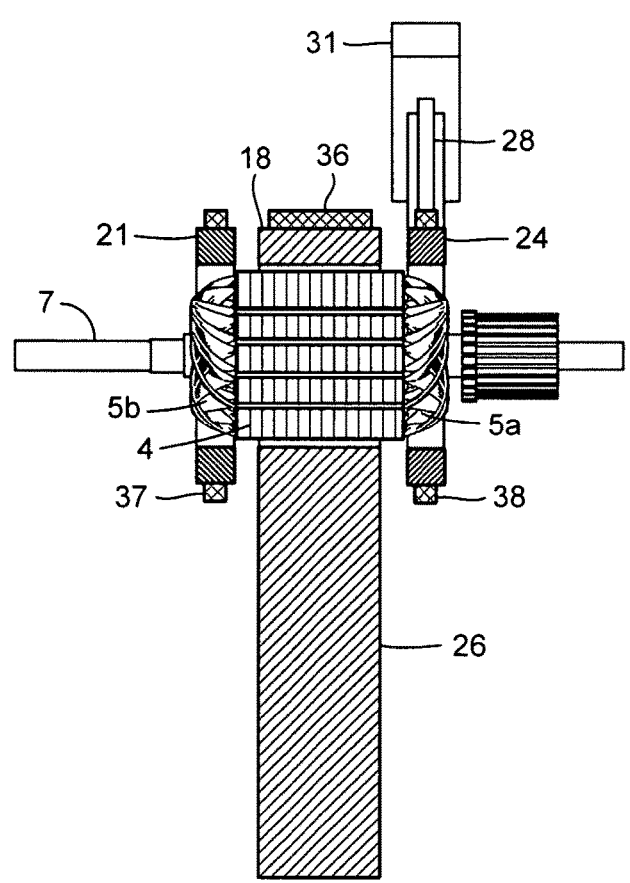
Figure 6:
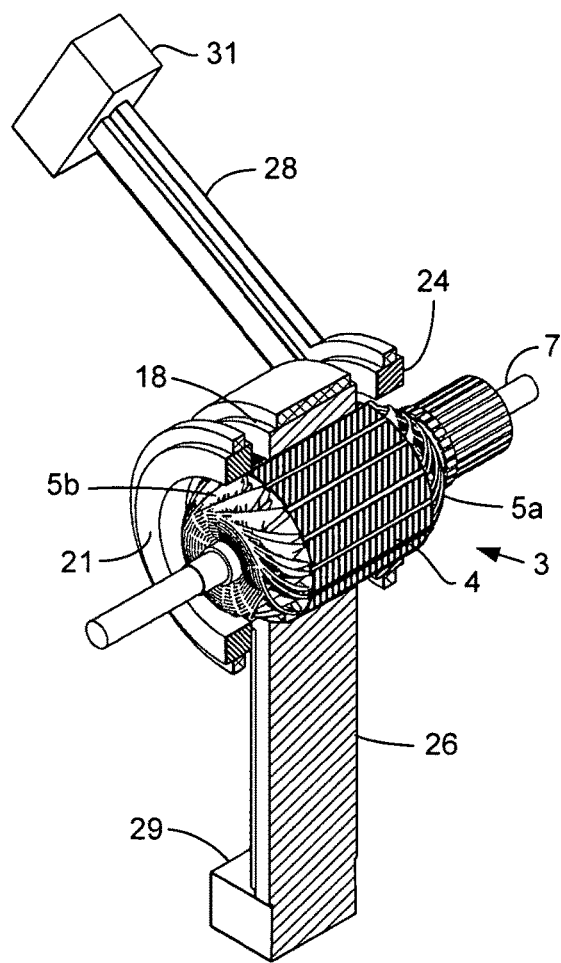
Figure 7:
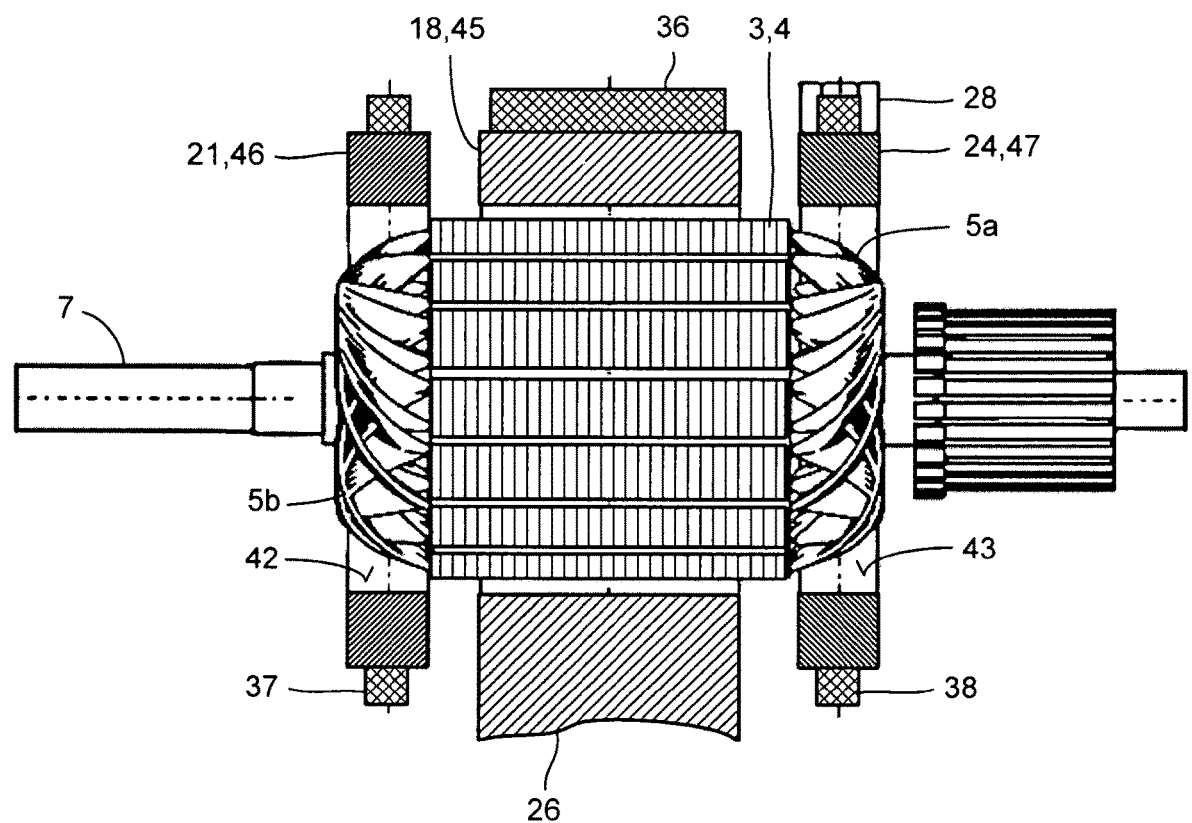
Figure 8:
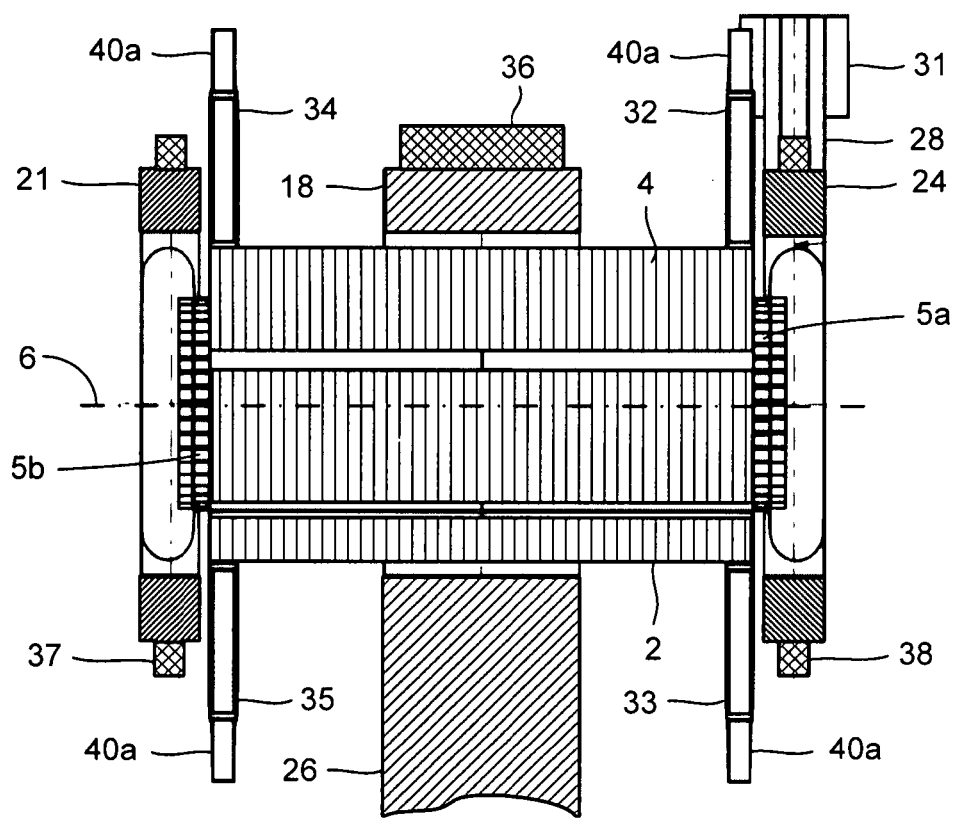
Figure 9:
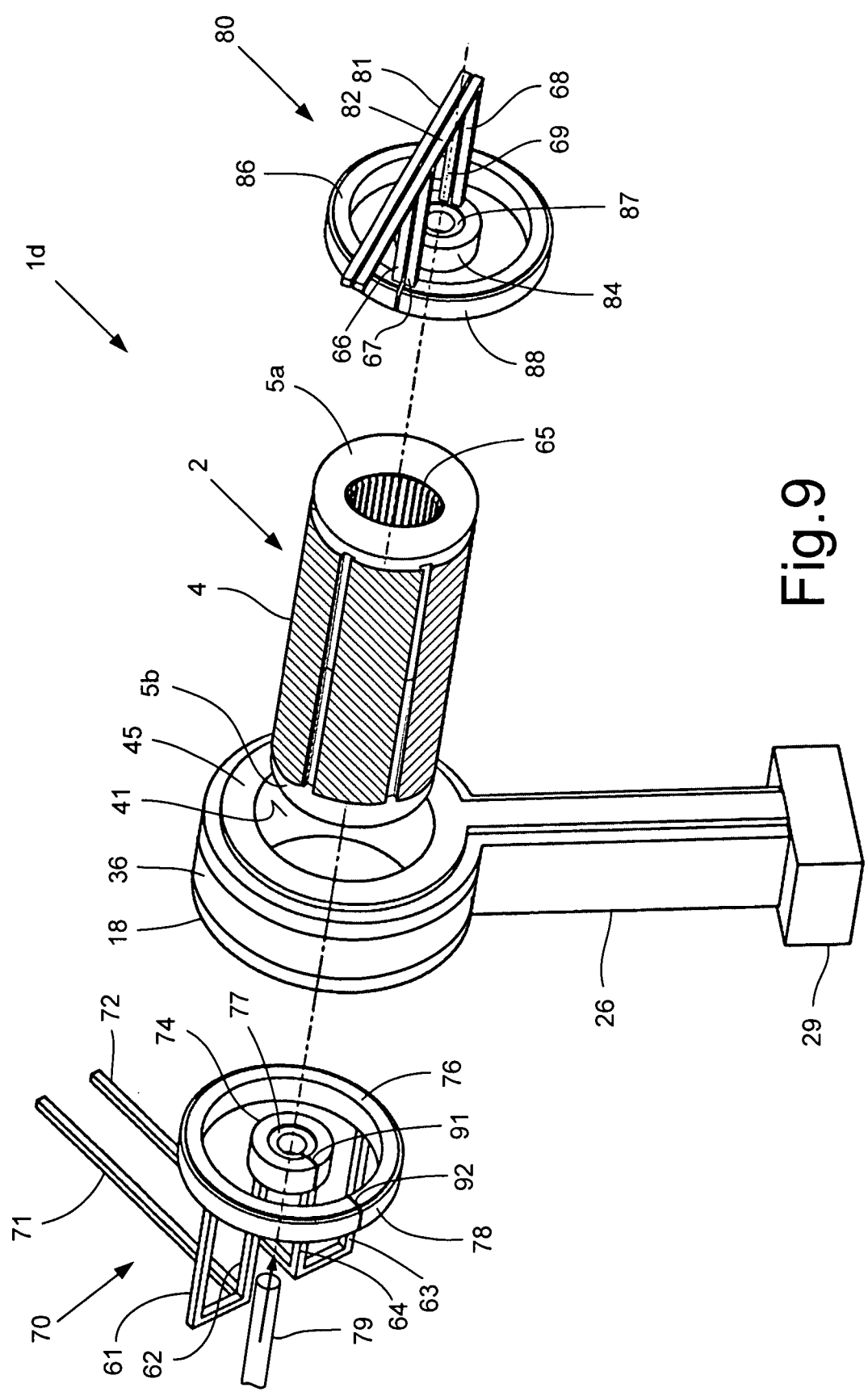
Figure 10:
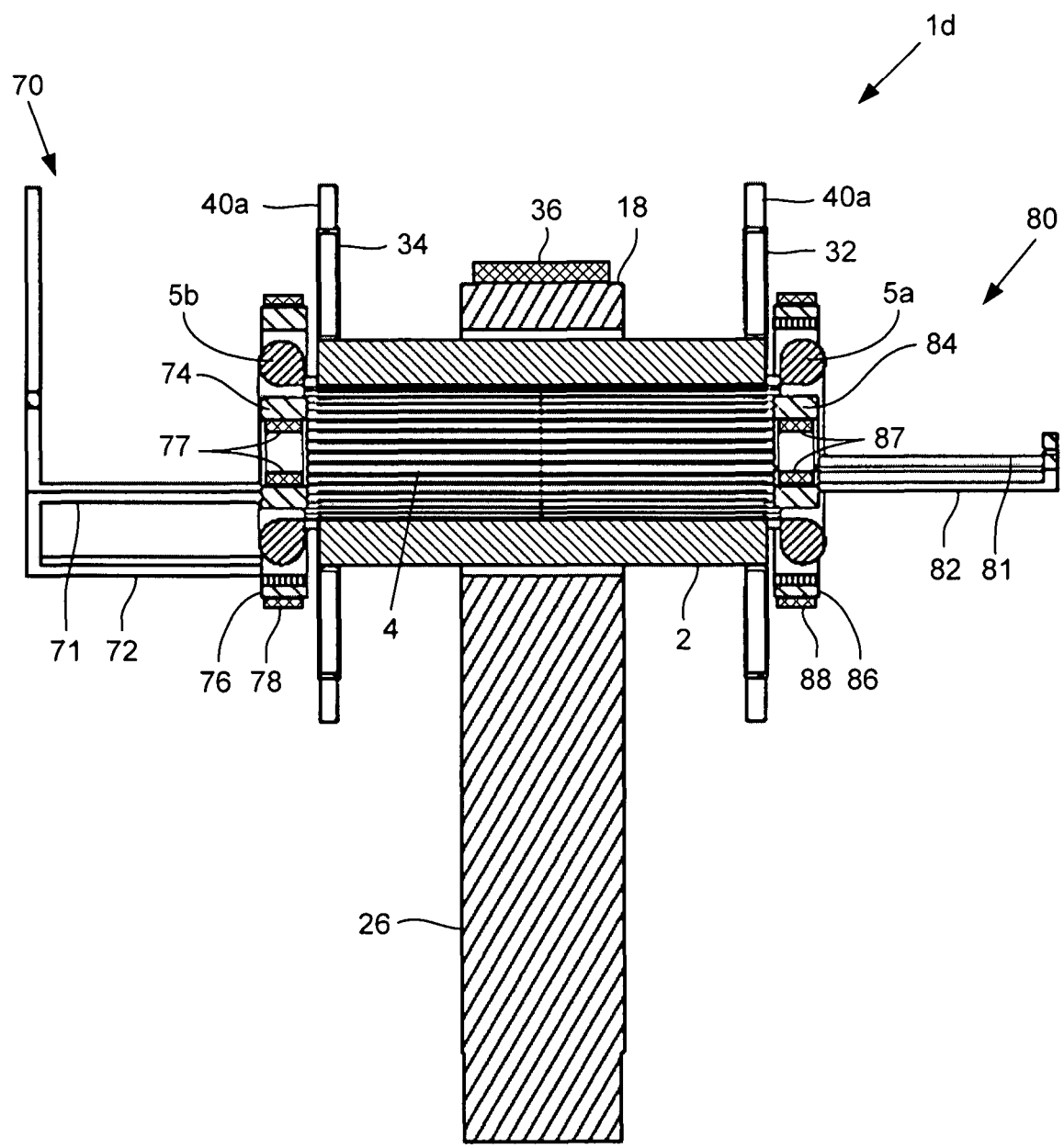

For a better understanding of the invention, a drawing is attached in which exemplary embodiments are shown. In which drawing:

FIG. 1 is a schematic representation of an impregnating device in which a heating device is integrated, the heating device having the features of the invention according to a first embodiment, FIG. 2 shows a schematic representation of a heating device according to the invention according to a second embodiment, FIG. 3 shows a schematic representation of a heating device according to the invention according to a third embodiment, FIG. 4 shows an exploded perspective view of a heating device similar to that of FIG. 3, but with shielding elements, FIG. 5 shows the heating device according to FIG. 4 in a partial axial section together with an armature of an electric machine disposed therein, FIG. 6 shows the heating device according to FIG. 4 in a perspective axial section, FIG. 7 shows a heating device similar to that according to FIG. 4 in a longitudinal sectional view, but without shielding elements, FIG. 8 shows the heating device according to FIG. 4, but together with a stator of an electric machine disposed therein and with shielding components, FIG. 9 shows an axially exploded view of a heating device having three inductors, of which each of the two axial end-side inductors has two radially spaced coil bodies, and FIG. 10 shows the heating device according to FIG. 9 in a schematic longitudinal section.

FIG. 1 shows a first embodiment of a heating device 1a having the features of the invention, the device being integrated in an impregnating device 50. In the example shown, the heating device 1a is used for as fast and uniform heating as possible and for evenly maintaining the temperature of a still unfinished armature 3 of an electric machine. The impregnating device 50 includes a frame 51 to which a feeding device 52 for a synthetic resin 55, an axial actuator 11 and a frequency generator 13, among other things, are fixed. The feeder 52 has a storage tank, which is not shown, and at least one pump which is not shown. By means of the pump liquid synthetic resin 55 which is still liquid is fed through two feed lines 53, 54 to the two axial ends 5a, 5b of the armature 3, where the resin is introduced into the armature 3, filling all cavities between the winding lines and the components of a lamination core 4 there. No later than when the still liquid synthetic resin 55 flows in, the armature 3 is rotated about its longitudinal axis 7 by means of a drive motor 44 so that the synthetic resin 55 is optimally distributed. Before the armature 3 is filled with the synthetic resin 55, the armature 3 is heated to a so-called trickling temperature of 100° C., for example, in order to promote uniform distribution of the synthetic resin 55 in the stator 3. In this case as well, the armature 3 can be rotated about its longitudinal axis in order to achieve the most uniform heating possible. As soon as the armature 3 is completely filled with the synthetic resin 55, the armature is heated to a curing temperature of 170° C., for example, at which temperature the synthetic resin 55 cures to form a thermosetting plastic.

The heating device 1a is used for heating the armature 3 to the trickle temperature and later on to the curing temperature, the heating device being able to heat the armature 3 inductively. This heating device 1a comprises the axial actuator 11 already mentioned, the final control element 10 of which is connected in the form of a coupling bar by means of a coupling piece 29. As indicated in FIG. 1 by means of the connection 90, the respective final control element 10 of the axial actuator 11 can also be connected directly to the coaxial transformer 59 of the inductor 8. Two electrically-conductive, wire-like, tubular or hose-like electrical lines 14, 15 are routed to the coupling piece 29 by way of a coaxial transformer 59, said electrical lines being cooled by a cooling fluid using a cooling device, which is not shown. The other ends of the electrical lines 14, 15 are connected to the frequency generator 13, which has already been mentioned and which sends an electric current therethrough which is suitable regarding voltage and current.

The coupling piece 29 is also connected to a two-armed radial bridge 9 of an inductor 8 which is formed into an annular or helical bobbin 49 remote from the coupling piece. The bobbin 49 and the two-armed radial bridge 9 consist integrally of a helically bent copper tube through which a cooling liquid flows. In the example shown in FIG. 1, the armature 3 to be tempered is held radially inside the bobbin 49, forming an annular gap. The bobbin 49 is electrically connected to said electrical leads 14, 15 by way of the two-armed radial bridge 9 and the coupling piece 29, so that an electrical voltage can be applied to the bobbin 49.

Accordingly, during an axial movement of the final control element 10 of the axial actuator 11, the bobbin 49 of the single inductor 8 is moved coaxially with the longitudinal axis 7 of the armature 3. The double arrow 12 in FIG. 1 illustrates the two directions of movement. Since the electrical lines 14, 15 are designed to be flexible, they make the axial movement undamaged.

In the first exemplary embodiment shown in FIG. 1, the single inductor 8 is periodically moved back and forth coaxially over the radial outer circumferential surface of the armature 3 to provide inductive heating to said trickling temperature and for keeping the said curing temperature constant. This is done by a preferably coaxial translation of the inductor 8 over the length of the region of the stator or armature 3 to be heated. The translational movement of the inductor 8 can be uniform or can be accelerated between the axial end-side reversal points. It is also possible to use a movement pattern previously determined to be optimal, which specifies portions of lower or higher speed for the inductor 8 along a translation path.

In certain applications, it is possible to deviate from a translation of the inductor 8 coaxially with the longitudinal axis 6, 7 of the stator 2 or armature 3, so that as a result an eccentric translational movement relative to the longitudinal axis is performed. In this way, in certain designs of the stator 2, armature 3 and/or inductor 8, the inductive heating thereof can be further optimized. In addition, this makes it possible to use identical inductors for stators or armatures 3 of different diameters, without having to have individual inductors available for each type of design. However, this presupposes that the inner diameter of the inductor 8 is so large that the bobbin 49 thereof cannot be moved coaxially but axially parallel to the stator 2 or armature 3 back and forth, and that the stator or armature can rotate. Accordingly, in an arrangement of the inductor radially within a stator 2, the outer diameter of the bobbin of the inductor must be so small that it can also not be moved coaxially but rather axially parallel within the stator 2. This will be discussed in connection with the embodiment shown in FIGS. 9 and 10.

Of particular importance now is that during its operation in the region of the two axial ends of the armature 3, i.e. where the winding heads 5a, 5b are designed, the single inductor 8 generates a respective electromagnetic field there which in each case has a higher frequency than a third electromagnetic field acting in the middle region of the armature 3 formed between these two winding heads 5a, 5b. The iron-containing laminations of a lamination core 4 are disposed in this central region of the armature 3. In contrast, the winding wires are made of a material having different electromagnetic properties, such as copper or a copper alloy.

The two electromagnetic fields generated at the axial ends and the electromagnetic field generated axially centrally are adjusted in terms of oscillation frequency so that each of the main components of the armature 3 is inductively heated optimally fast and uniformly. Therefore, when the single inductor 8 is in the region of the lamination core 4, the single frequency generator 13 generates a medium-frequency voltage by means of which a medium-frequency electromagnetic field is generated by the single inductor 8. However, as soon as the single inductor 8 is in the region of one of the two winding heads 5a, 5b, the single frequency generator 13 generates a high-frequency voltage, by means of which a high-frequency electromagnetic field is generated by the single inductor 8.

In FIG. 1, those two regions in which a high-frequency electromagnetic field acts on the armature 3 are provided with the reference numeral HF, while the axially interposed region in which a medium-frequency field acts on the armature 3 is provided with the reference numeral MF. Although the high-frequency electromagnetic field does not act radially deeply into the armature 3, the copper material of the winding lines freely emerging from the winding heads 5a, 5b can be inductively heated thereby in a particularly effective manner. In contrast, the medium-frequency electromagnetic field can penetrate radially comparatively deep into the armature 3, and energy can be particularly advantageously inductively coupled into the ferrous laminations of the lamination core 4 of the armature 3 and converted there into heat.

FIGS. 2 and 3 show two further embodiments of heating devices 1b, 1c which have the features of the invention. The components of the impregnating device 50 have been omitted to simplify the figures.

FIG. 2 shows a heating device 1b, which also has only one axial actuator 11 with a final control element 10, a coupling piece 29, a two-arm radial bridge 9 and only a single inductor 8 with a helical bobbin 49. In this case as well, the helical bobbin 49 of the single inductor 8 surrounds the armature 3 coaxially, and the inductor 8 and its bobbin 49 can move back and forth coaxially to the longitudinal axis 7 of the armature 3 while maintaining an annular gap above the armature, the gap being not visible in FIG. 2. In contrast to the heating device 1a according to FIG. 1, the heating device 1b shown in FIG. 2 has two frequency generators 16a and 16b. The first frequency generator 16a can generate a medium-frequency electrical voltage and the second frequency generator 16b can generate a high-frequency electrical voltage. The electrical voltages of the two frequency generators 16a, 16b are routed to the bobbin 49 of the single inductor 8 by way of a double-acting coaxial transformer 60, wherein this coaxial transformer 60 is attached to a coupling piece 29 as well.

One of the two medium-frequency or high-frequency electrical voltages is applied to the single inductor 8 and its bobbin 49 one after the other so that this single inductor 8 generates two electromagnetic fields of different frequencies. In this case, the medium-frequency voltage of the first frequency generator 16a is routed to the single inductor 8 when the inductor is located in the region of the lamination core 4 or axially between the two winding heads 5a, 5b. On the other hand, the high-frequency voltage of the second frequency generator 16b is then routed to the single inductor 8 when it is in the region of the respective winding heads 5a, 5b. Minor positioning inaccuracies are not particularly harmful here, since all electrically conductive regions of the armature 3 contribute to the inductive heating of the same, but with a different effectiveness.

According to another embodiment, the two frequency generators 16a, 16b may be integrated into a single unit which comprises a switching device for switching between the two frequency generators 16a, 16b, and which is connected to the single inductor 8 through common electrical lines by way of the coaxial transformer 60. This coaxial transformer 60 is then designed as a double coaxial transformer.

In special applications, it can be that medium-frequency and high-frequency electromagnetic fields are generated at the same time and are used for heating a stator or armature to predetermined temperatures and keeping the same heated.

In the third embodiment of a heating device 1c for a stator 2 or armature 3, said device having the features of the invention, as illustrated in FIG. 3, a total of three individual inductors 18, 21, 24 are provided, each axially movably disposed by means of a separate axial actuator 17, 20, 23. The three axial actuators 17, 20, 23 each have a final control element 10 which is connected through a respective coupling piece 29, 30, 31 to a respective two-armed radial bridge 26, 27, 28 of the three inductors 18, 21, 24. The three inductors 18, 21, 24 each have a helical bobbin 49a, 49b, 49c, which is disposed coaxially over an armature 3. Each of the three inductors 18, 21, 24 is supplied during operation by a respective separate frequency generator 19, 22, 25 with a medium-frequency or high-frequency electrical voltage so that the bobbins 49a, 49b, 49c can generate electromagnetic fields with different frequencies.

Also in this embodiment, the three frequency generators 19, 22, 25 are each connected to a coaxial transformer 56, 57, 58 by way of electrical lines 14, 15, each transformer being attached to the respective associated coupling piece 29, 30, 31 of the inductors 18, 21, 24. From there, the two-armed radial bridges 26, 27, 28 lead to the bobbins 49a, 49b, 49c of the three inductors 18, 21, 24. In the electrical line 14, 15 between the medium-frequency generator 19 and the medium-frequency inductor 18, an electronic interference suppression means 48 is disposed for protecting the electronic components of the medium-frequency generator 19 against the effects of the two high-frequency alternating fields.

During operation of the heating device 1c, the axial middle inductor 18 in the lamination core 4 of the armature 3 generates a medium-frequency electromagnetic field whose active region MF covers almost the entire axial length of the armature 3. In order for this medium-frequency electromagnetic field to penetrate into the armature 3 in all regions of the armature 3 at the same intensity and the same radial depth of effect, the first inductor 18 is moved back and forth coaxially or axially parallel over the cylindrical outer peripheral surface of the armature 3 by means of the first axial actuator 17. The two inductors 21, 24 disposed at the axial ends, in the region of the two winding heads 5a, 5b, are moved back and forth axially during operation of the heating device 1c by means of the associated axial actuators 20, 23. However, in this case these two inductors 21, 24 only pass over the respective associated winding heads 5a, 5b. A collision of the three actuators 18, 21, 24 is of course avoided. The two inductors 21, 24 disposed coaxially over the winding heads 5a, 5b each generate a high-frequency electromagnetic field whose respective effective range HF is marked in FIG. 3 by double arrows. As already explained, these high-frequency electromagnetic fields are optimally suited to inductively heat the copper wires of the two winding heads 5a, 5b. From there, heat passes through the winding wires by heat conduction into the interior of the armature 3.

The heating devices 1a, 1b, 1c according to the invention according to FIGS. 1 to 3 all have the advantage that a plurality of electromagnetic fields can act on them at different locations of a stator 2 or armature 3. In this way, the different materials of which a stator or armature is made and which are also disposed at different radial depths in the stator or armature can be optimally heated inductively. In contrast, so far in generic heating devices, for the most part the stator or armature has been indirectly brought to a desired trickle temperature and/or maintained at a certain curing temperature in an oven in its entirety or by heating the winding wires of the stator or armature. In the heating device 1c according to FIG. 3, three different electromagnetic fields can act simultaneously on a stator 2 or armature 3 and heat it inductively, whereby a homogeneous temperature distribution is achieved in the stator or armature and a particularly short period of time passes until all components of the stator or armature have reached the desired temperature.

Since with the method proposed and the heating device 1a, 1b, 1c according to the invention both the winding wires and the laminations of the lamination core 4 of the stator 2 or armature 3 are inductively heated almost simultaneously using only one inductor 8 and simultaneously when using three inductors 18, 21, and 24 in particular, a very short warm-up time to reach a certain trickle temperature and a very uniform temperature distribution is achieved. The heating of the stator 2 or armature 3 until the gelling temperature and the curing temperature is reached is very fast and homogeneous. This is mainly due to the fact that an indirect heating of components of the stator 2 or armature 3 by heat conduction and heat radiation is required only to a limited extent, because according to the invention only the more or less electrically insulating components of the stator 2 or armature 3 are heated by heat conduction and/or thermal radiation, such as the insulating layer around the winding wires and optionally insulating materials placed in the stator 2 or armature 3.

The thermosetting plastic formed from the trickled synthetic resin by heating is particularly uniformly formed in the entire stator or armature due to the rapid and uniform reaching of the individual temperature ranges for the respective manufacturing process steps and thus consistently has the same properties, whereby this contributes to an optimum product quality of the stator or armature.

After having explained the basic structure and the mode of operation of the heating devices 1a, 1b, 1c according to the invention, special developments will be discussed below, which are illustrated in FIGS. 4 to 8. In these figures, in each case heating devices 1c shown always have three inductors 18, 21, 25 in different views, which essentially have the structure and the operation of the heating devices 1c according to FIG. 3. Therefore, only the further developments will be discussed below.

In an exploded view, an axial section and a partially cutaway view, FIGS. 4 to 6 show the three mentioned inductors 18, 21, 24 of the heating device 1c of FIG. 3, the inductors drawn schematically simplified in terms of structure but in the region of the annular bobbins 45, 46, 47 thereof, however, each having recognizable a hollow cylindrical receiving opening 41, 42, 43. The illustrated armature 3 or a stator 2 is inserted into these receiving openings 41, 42, 43, in such a way that the bobbin 45 of the medium-frequency inductor 18 surrounds at least an axial portion of the lamination core 4 of the armature 3 coaxially or in axially parallel fashion, and that the two high-frequency inductors 21, 24 surround at least an axial portion of the two end windings 5a, 5b of the armature 3 coaxially or in axially parallel fashion.

As FIG. 4 shows, in the embodiment shown there are four plate-like shielding elements 32, 33, 34, 35 which are disposed axially on both sides next to the medium-frequency inductor 18, i.e. axially between the medium-frequency actuator 18 and the two high-frequency inductors 21, 24. The arrangement of the shielding elements 32, 33, 34, 35 is designed so that they are positioned radially over the two ends or axial edges of the lamination core 4 near the winding head. As a result, the shielding elements 32, 33, 34, 35 are able to protect the axial-end edges of the lamination core 4 from excessive coupling of the electromagnetic fields and thus from excessive heating.

In addition, it is provided that the position of the field shielding components 32, 33; 34, 35 can be adapted to the axial length of each stator 2 or armature 3 to be heated or to the lamination core 4 thereof, but they are disposed axially immovable during operation.

The shielding elements 32, 33, 34, 35 are preferably made of copper or a copper alloy. They have a largely rectangular geometry with a circular arc-shaped cutout 39 which is disposed just above the surface of the armature 2. In the process, the radially inner and adjacent portions of the matched shielding elements 32, 33; 34, 35 are preferred to abut one another with no gap. In addition, each of the shielding elements 32, 33, 34, 35 has a feed opening 40a and a discharge opening 40b through which a cooling fluid can be passed for active cooling of the shielding elements 32, 33, 34, 35.

FIG. 7 shows the three inductors 18, 21, 24 already mentioned, with their bobbins 45, 46, 47 shown schematically, the inductors being disposed coaxially over a not yet finally finished armature 3 of an electric machine. In this embodiment, in each case a field concentrator 36, 37, 38 is disposed on the inductors 18, 21, 24 radially on the outside, i.e. outside the bobbin 45, 46, 47. The field concentrators 36, 37, 38 are each preferably made of a ferrous material. The field concentrator 36, which is attached to the axially-middle inductor 18 and which has a circular or circular segment-shaped geometry, is constructed and disposed such that by means of said concentrator the medium-frequency electromagnetic field of the inductor 18 is concentrated radially inward, so that the electromagnetic field reaches the laminations of the lamination core 4 of the armature 3 to the greatest possible radial depth. In contrast thereto, it is provided that the field concentrators 37, 38 fastened to the two axial end-side inductors 21, 24 are constructed and disposed in such a way that they concentrate the high-frequency electromagnetic field of these inductors 21, 24 radially inward and axially outward. As a result, a potentially harmful influence of the high-frequency electromagnetic fields on the electronic components of the medium-frequency generator is kept low, and also the high-frequency electromagnetic fields can inductively heat the respective associated winding head 5a, 5b particularly effectively.

FIG. 8 shows a partial schematic longitudinal section through a stator 2 which can be inductively heated by means of the three inductors 18, 21, 24 already described in order to introduce a synthetic resin thereinto and allow the resin to harden there. The three inductors 18, 21, 24 are disposed coaxially to the longitudinal axis 6 of the stator 2 radially over the outer circumferential surface and and can move axially back and forth by means of the already described axial actuators 17, 20, 23. The inductors 18, 21, 24 each have a radial field concentrator 36, 37, 38 on the outside, by means of which, as just described, the electromagnetic fields generated by the inductors 18, 21, 24 can be concentrated in desired directions. In addition, two shielding elements 32, 33; 33, 34 are disposed axially close to the two high-frequency inductors 21, 24 and radially above the respective axial end of the lamination core 4, the elements being used to shield the axial-end edges of the lamination core 4 from excessive energy coupling by the high-frequency electromagnetic fields. In this example, the shielding elements 32, 33; 33, 34 can be seen to be aligned with the axial edges of the lamination core 4.

The field concentrators 36, 37, 38 and the field shielding components 32, 33; 34, 35 may in this case be designed and disposed such that constructive and/or destructive interferences of the interacting electromagnetic fields can be generated by means of which the heating power at the axial sections of the stator 2 or armature 3 is optimized to be either iron-specific (lamination core) and/or copper-specific (winding).

FIGS. 9 and 10 show, in different views, in each case a heating device 1d having the features of the invention, the device having two inductors which act on the axial ends of a stator 2 and which are designed as so-called double inductors 70, 80. An inductor 18 is disposed axially between these two double inductors 70, 80, the inductor having the design according to FIGS. 1 to 8 already described. Accordingly, this middle inductor 18 has a bobbin 45 which is circular in this case but in detail is circular or spiral in shape, often with only one turn, the hollow cylindrical receiving opening 41 of the bobbin being able to be moved back and forth radially over the winding 4 of the stator 2.

Deviating from this, the double inductors 70, 80 each comprise two radially displaced, annular bobbins 74, 76; 84, 86 whose tubular electrical conductors, which cannot be seen, have formed each of the bobbins 74, 76; 84, 86 into an almost completely closed ring. It is clear to see that the bobbins 74, 76; 84, 86 are designed as non-closed by means of a respective radial gap, only two of said radial gaps 91, 92 being shown in FIG. 9.

In each case a medium-frequency and/or high-frequency electric current for generating electromagnetic fields can be passed through the electrical conductors of the bobbins 74, 76; 84, 86. The ends of the electrical conductors of the radially inner and radially outer bobbins 74, 76; 84, 86 transition to an axially-aligned feed line section 61, 62, 63, 64, 66, 67, 68, 69 of the same polarity. Then two feed line sections 61, 62; 63, 64; 66, 67; 68, 69 each are connected to one of two radial bars 71, 72; 81, 82. These radial bars 71, 72; 81, 82 are directly or indirectly electrically connected to the frequency generators already described away from the bobbin by way of coupling pieces, which are not shown. As already described in connection with the other exemplary embodiments, the radial bars 71, 72; 81, 82 are also connected to the final control element 10 of a respective associated axial actuator by way of a coaxial transformer or a coupling piece, the actuator being able to move the radial bars 71, 72; 81, 82 and thus ultimately the bobbins 74, 76; 84, 86 axially back and forth.

The two bobbins 74, 76; 84, 86 of the two double inductors 70, 80 are each designed such that the stator 2 can be heated thereby simultaneously inductively radially both from the inside and from the outside. For this purpose, the dimensions of each of the radially inner bobbins 74; 84 are such that the bobbins can be disposed inside the cylindrical cavity 65 of the stator 2 and moved back and forth axially therein without making contact. In contrast, the dimensions of the radially outer bobbin 76, 86 are such that it can be moved radially back and forth over the stator 2 without making contact.

In this embodiment as well, to steer the electromagnetic field generated by the respective bobbin 74, 76; 84, 86, an outer field concentrator 78, 88 can be disposed on the radially outer side of the radially outer bobbin 76, 86, the concentrator concentrating an electromagnetic field radially inward and axially outward, and an inner field concentrator 77, 87 can be disposed on the radially inner side of the respective radially inner bobbin 74, 84, the concentrator concentrating an electromagnetic field radially and axially outward.

As can be seen in particular in FIG. 9, according to another advantageous development of the double inductor 70 shown on the left in the drawing, a component 79 of a holding and driving device can be passed through the radially inner circular-shaped bobbin 74, by means of said component the stator 2 is held fixed and rotatable about the longitudinal axis 6 thereof.

Furthermore, in this heating device 1d the two annular bobbins 74, 76; 84, 86 of a double inductor 70, 80, as shown, can be disposed in the same radial plane or in the same axial section or in different radial planes, and thus axially spaced apart from one another. In an arrangement of the bobbin 74, 76; 84, 86, it is possible to carry out particularly targeted heating in the same radial plane, for example heating of the axial-end winding heads 5a, 5b of the stator 2. In an arrangement of the bobbins 74, 76; 84, 86 in different radial planes, i.e. axially offset from each other, the stator 2 can be heated simultaneously from different locations radially from the inside and radially from the outside. Thus, it can be provided in this heating device 1d that the two axial-end double inductors 70, 80 are designed such that the radially inner bobbins 74; 84 thereof are disposed closer to the middle inductor 18 disposed axially therebetween than the respective radially outer bobbins 76, 86.

With the heating devices 1a, 1b, 1c, 1d having the features of the invention and with the method according to the invention, it is possible to effect a very efficient trickling impregnation of stators 2 and armatures 3 which are intended for the production of electric machines.

LIST OF REFERENCE SIGNS

1a Heating device (first embodiment)
1b Heating device (second embodiment)
1c Heating device (third embodiment)
1d Heating device (fourth embodiment)
2 Stator
3 Armature
4 Ferrous component, lamination core
5a First axial end of the armature or stator, first winding head
5b Second axial end of the armature or stator, second winding head
6 Longitudinal axis of the stator
7 Longitudinal axis of the armature
8 Single inductor
9 Radial bar of the single inductor 8
10 Final control element of axial actuator 11
11 First axial actuator
12 Adjustment direction of the final control element 10
13 Single frequency generator
14 First electrical line (liquid-cooled)
15 Second electrical line (liquid-cooled)
16a First frequency generator 16b Second frequency generator
17 Middle axial actuator
18 Medium-frequency inductor
19 Medium-frequency generator
20 First end axial actuator
21 First high-frequency inductor
22 First high-frequency generator
23 Second end axial actuator
24 Second high-frequency inductor
25 Second high-frequency generator
26 Radial bar of the medium-frequency inductor 18
27 Radial bar of the first high-frequency inductor 21
28 Radial bar of the second high-frequency inductor 24
29 First coupling piece
30 Second coupling piece
31 Third coupling piece
32 First shielding element
33 Second shielding element
34 Third shielding element
35 Fourth shielding element
36 Medium-frequency field concentrator
37 First high-frequency field concentrator
38 Second high-frequency field concentrator
39 Cutout on the shielding element
40a Feed opening for cooling fluid on the shielding element
40b Discharge opening for cooling fluid on the shielding element
41 Receiving opening at the medium-frequency inductor
42 Receiving opening at the first high-frequency inductor
43 Receiving opening on the second high-frequency inductor
44 Drive motor
45 Bobbin of the first inductor or medium-frequency inductor 18
46 Bobbin of the second inductor or high-frequency inductor 21
47 Bobbin of the third inductor or high-frequency inductor 24
48 Interference suppression means
49 Bobbin of the single inductor 8
49a Bobbin of the medium-frequency inductor 18
49b Bobbin of the high-frequency inductor 21
49c Bobbin of the high-frequency inductor 24
50 Impregnating device
51 Frame
52 Feeding device for synthetic resin
53 First feed line of the impregnation device
54 Second feed line of the impregnation device
55 Synthetic resin
56 Coaxial transformer
57 Coaxial transformer
58 Coaxial transformer
59 Coaxial transformer
60 Coaxial transformer
61 Feed line section
62 Feed line section
63 Feed line section
64 Feed line section
65 Cylindrical cavity of the stator 3
66 Feed line section
67 Supply section
68 Feed line section
69 Feed line section
70 First double inductor
71 First radial bar of double inductor 70
72 Second radial bar of double inductor 70
74 Radial inner bobbin of double inductor 70
76 Radial outer bobbin of double inductor 70
77 Radial inner field concentrator of double inductor 70
78 Radially outer field concentrator of double inductor 70
79 Component of a holding and driving device
80 Second double inductor
81 First radial bar of double inductor 80
82 Second radial bar of double inductor 80
84 Radial inner bobbin of double inductor 80
86 Radial outer bobbin of double inductor 80
87 Radial inner field concentrator of double inductor 80
88 Radially outer field concentrator of double inductor 80
90 Connection between final control element 10 and coaxial transformer 59
91 Radial gap on the bobbin 74
92 Radial gap on the bobbin 76
MF Effective range of a medium-frequency alternating field
HF Effective range of a high-frequency alternating field

The invention claimed is:

1. A method for inductively heating a stator or an armature of an electric machine, the method comprising:
maintaining a heat before and during a trickle impregnation thereof, wherein inductive heating takes place by electromagnetic fields of different frequency, and wherein the electromagnetic fields of different frequency act on different axial regions of the stator or the armature.

2. The method according to claim 1, wherein the electromagnetic fields of different frequency act on the stator or the armature simultaneously or one after the other.

3. The method according to claim 1, wherein the electromagnetic fields, in a medium-frequency, range between 8 kHz and 60 kHz, and in a high frequency, range between 61 kHz and 500 kHz, including the range limits thereof, and that an oscillation frequency of the respective electromagnetic field is matched to a radial and inductive heating effective penetration depth in the stator or the armature.

4. The method according to claim 1, wherein at least a first electromagnetic field acts on the stator or the armature, the field leading to the inductive heating of ferrous components of the stator or the armature, and wherein at least a second electromagnetic field acts on the stator or the armature at a frequency which is tuned to inductively heat the copper-containing components of the stator or the armature.

5. The method according to claim 4, wherein a medium-frequency electromagnetic field acts on an axially central portion of the stator or the armature in which a lamination core of the stator or the armature is disposed as an iron-containing component, and that at two axial ends of the stator or the armature, where winding heads thereof are disposed as copper-containing components, a high-frequency alternating field acts on the stator or the armature, respectively.

6. The method according to claim 1, wherein the electromagnetic fields of different frequency are moved back and forth coaxially or parallel to a longitudinal axis of the stator or the armature.

7. The method according to claim 1, wherein the stator or the armature is rotated about a longitudinal axis thereof during the acting of the electromagnetic fields of different frequency thereon.

8. The method according to claim 1, wherein the electromagnetic fields of different frequency are applied for inductively heating the stator or the armature from a single frequency generator, generated in temporal succession.

9. The method according to claim 1, wherein a plurality of frequency generators each generate an electromagnetic field, these electromagnetic fields oscillating at different frequencies, and that these different-frequency electromagnetic fields act on the stator or the armature, inductively heating them.

10. The method according to claim 1, wherein the electromagnetic fields of different frequency are concentrated at least with regard to an axial extent thereof.

11. The method according to claim 10, wherein a medium-frequency electromagnetic field is concentrated onto a region of the stator or the armature in which an iron-containing lamination core thereof is disposed, and in that high-frequency electromagnetic fields are concentrated onto two axial ends of the stator or the armature where copper-containing winding heads thereof are disposed.

12. The method according to claim 10, wherein a medium-frequency electromagnetic field is concentrated radially inward, and two high-frequency electromagnetic fields are concentrated radially inward and axially outward.

13. The method according to claim 1, wherein a medium-frequency electromagnetic field is shielded against two high-frequency alternating fields.

14. The method according to claim 13, wherein shielding elements present for the purposes of shielding are cooled with a cooling fluid.

15. The method according to claim 1, wherein the electromagnetic fields of different frequencies which act axially adjacent to one another are matched to one another such that a shielding of the electromagnetic fields relative to each other or an amplification of the adjacent electromagnetic fields is achieved in an interference region by destructive interference or constructive interference.

16. The method according to claim 1, wherein in the stator, electromagnetic fields of the same or different frequency act thereon radially inwardly and/or radially outwardly in order to inductively heat components of the stator.

17. A heating device for inductively heating a stator or an armature of an electric machine and maintaining a heat before and during trickle impregnation thereof, the heating device comprising:
    at least one electromagnetic inductor which is disposed coaxially or axially parallel with respect to a longitudinal axis of the stator or the armature and by means of which the stator or the armature can be inductively heated, wherein at least one electromagnetic inductor is designed to generate at least two electromagnetic fields of different frequencies, wherein the at least one electromagnetic inductor is a single inductor disposed coaxially or axially parallel and radially within the stator or coaxially or axially parallel and radially outside the armature, the single inductor being disposed moveably back and forth over an entire axial length of the stator or the armature, and that an electromagnetic field can be generated with the single inductor in a region of each of two axial ends of the stator or the armature, the electromagnetic fields differing in terms of oscillation frequency from an electromagnetic field acting between the two axial ends, and wherein the single inductor is configured to generate a high-frequency electromagnetic field in a region of axial ends of the stator or the armature and a medium-frequency electromagnetic field in a middle region therebetween.

18. The heating device according to claim 17, wherein the at least one electromagnetic inductor includes a single inductor that can be supplied alternatingly or simultaneously with a medium-frequency or a high-frequency electrical voltage from a single frequency generator.

19. The heating device according to claim 17, wherein the at least one electromagnetic inductor includes a single inductor that can be supplied alternately or simultaneously by a medium-frequency generator with a medium-frequency electrical voltage or by a high-frequency generator with a high-frequency electrical voltage.

20. The heating device according to claim 17, wherein the at least one electromagnetic inductor includes three inductors disposed axially moveably, the three inductors surrounding axial sections of the stator or the armature coaxially or axially parallel, wherein a middle inductor is disposed above a central axial section of the stator or the armature, a ferrous lamination core of the stator or the armature being disposed in the middle inductor, wherein two axial end-side inductors are disposed in a region of two axial ends of the stator or the armature, copper-containing winding heads of the stator or the armature being disposed in the axial end-side inductors, wherein a medium-frequency electromagnetic field can be generated with the middle inductor, and wherein a high-frequency electromagnetic field can be generated by each of the two axial end-side inductors.

21. The heating device according to claim 20, wherein the three inductors include radial bars that are aligned with one another offset by 120° with respect to the longitudinal axis of the stator or the armature.

22. The heating device according to claim 20, wherein a field concentrator is disposed on a bobbin of at least one of the three inductors radially on an outside thereof, the field concentrator including at least one ferrous body.

23. The heating device according to claim 22, wherein the field concentrator is attached to the bobbin of the middle inductor and disposed so as to concentrate the medium-frequency electromagnetic field radially inwardly.

24. The heating device according to claim 22, wherein the field concentrator is attached to a bobbin of the two axial-end side inductors and disposed in such a way that the field concentrator concentrates the high-frequency electromagnetic field radially inward and axially outward.

25. The heating device according to claim 20, wherein a field-shielding component is disposed at each axial-end edge of the lamination core, the field-shielding component configured to protect the axial-end edges against strong coupling of the high-frequency electromagnetic field and thus against excessive heating.

26. The heating device according to claim 25, wherein the field shielding component includes copper and can be actively cooled by a fluid that can be passed therethrough.

27. The heating device according to claim 25, wherein the field shielding component is disposed axially immovable and coaxially above the stator or the armature.

28. The heating device according to claim 20, wherein a field concentrator and a field shielding component are disposed such that constructive and/or destructive interferences of the electromagnetic fields can be generated thereby, said interferences optimizing heating power at axial sections of the stator or the armature in an iron-specific (lamination core) and/or copper-specific (winding) manner.

29. The heating device according to claim 20, wherein the at least one electromagnetic inductor is electrically connected to an associated frequency generator by way of a coaxial transformer.

30. The heating device according to claim 20, wherein a final control element of an axial actuator is connected to at least one radial bar of the at least one electromagnetic inductor by way of a coaxial transformer.

31. The heating device according to claim 20, wherein the at least one electromagnetic inductor includes a plurality of inductors, an electro-technical interference suppression means disposed in a line region between a medium-frequency inductor and an associated medium-frequency generator, wherein the suppression means protects electronic components of the associated medium-frequency generator.

32. The heating device according to claim 20, wherein the at least one electromagnetic conductor includes two inductors that act on an axial end of the stator and are configured as double inductors, and that these double inductors each comprise two annular or helical bobbins which are offset radially from one another, to each of which a medium-frequency or high-frequency electrical voltage can be applied, a radially inner bobbin of which is configured such that the radially inner bobbin can be disposed inside a cylindrical cavity of the stator and can move back and forth axially without making contact, and a radially outer bobbin of which is configured so that the radially outer bobbin can move back and forth axially radially above the stator without making contact.

33. The heating device according to claim 32, wherein an outer field concentrator is disposed radially on a radial outside of the radially outer bobbin of the double inductor, the concentrator concentrating an electromagnetic field radially inward and axially outward, and wherein an inner field concentrator is disposed on a radial inside of the radially inner bobbin, the concentrator concentrating an electromagnetic field radially outward and axially outward.

34. The heating device according to claim 32, wherein a component of a holding and driving device can be passed through the radially inner bobbin of the double inductor, the component holding the stator fixedly and rotatably about the longitudinal axis thereof.

35. The heating device according to claim 32, wherein the two annular or helical bobbins of the double inductor are disposed in the same axial section or axially offset from one another.

36. The heating device according to claim 32, wherein the double inductors are configured such that the radially inner bobbins thereof are disposed axially closer to the middle inductor disposed therebetween than the respective radially outer bobbins.

37. The heating device according to claim 17, wherein the at least one electromagnetic inductor comprises an annular or a helical bobbin and a two-part radial bar, wherein the radial bar is connected to a coupling piece remote from the bobbin, and the coupling piece is at least indirectly connected to an associated axial actuator by means of which the at least one electromagnetic inductor can move back and forth together with the radial bar coaxially or parallel to the longitudinal axis of the stator or the armature.

\* \* \* \* \*